(12) United States Patent
Wilson et al.

(10) Patent No.: US 10,492,266 B2
(45) Date of Patent: *Nov. 26, 2019

(54) METHOD AND SYSTEM FOR CONTROLLING FUNCTIONALITY OF LIGHTING DEVICES FROM A PORTABLE ELECTRONIC DEVICE

(71) Applicant: Eaton Intellectual Power Limited, Dublin (IE)

(72) Inventors: Brian M. Wilson, Syracuse, NY (US); Joseph R. Casper, Syracuse, NY (US); Christopher D. Nolan, Syracuse, NY (US)

(73) Assignee: Eaton Intellectual Power Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/154,050

(22) Filed: Oct. 8, 2018

(65) Prior Publication Data
US 2019/0116635 A1 Apr. 18, 2019

Related U.S. Application Data

(63) Continuation of application No. 15/786,274, filed on Oct. 17, 2017, now Pat. No. 10,098,201.

(51) Int. Cl.
*H05B 33/08* (2006.01)
*F21V 15/01* (2006.01)
(Continued)

(52) U.S. Cl.
CPC ......... *H05B 33/089* (2013.01); *F21V 15/012* (2013.01); *F21V 23/02* (2013.01);
(Continued)

(58) Field of Classification Search
CPC ........ G05B 19/00; G05B 19/02; G05B 19/04; H04L 67/025
(Continued)

(56) References Cited

U.S. PATENT DOCUMENTS 8,878,451 B2 11/2014 Lee et al.
9,188,307 B2 11/2015 Casper et al.
(Continued)

FOREIGN PATENT DOCUMENTS

KR 20110048816 A 5/2011
KR 20170097207 A 8/2017

*Primary Examiner* — Thuy V Tran
(74) *Attorney, Agent, or Firm* — Fox Rothschild LLP

(57) ABSTRACT

A system for controlling lighting devices at one or more light-enabled facilities includes a processor in communication with a portable electronic device. The processor is configured to transmit a set of available scenes for one or more gateway controllers to the portable electronic device, receive a light operation request comprising a selected scene and a time duration from the portable electronic device, determine whether the portable electronic device is authorized to cause a gateway controller associated with the selected scene to implement the light operation request, and if the portable electronic device is authorized to cause the gateway controller associated with the selected scene to implement the light operation request, transmit the light operation request and an authorization token to cause the gateway controller to activate at least one lighting device according to the selected scene and the time duration to the gateway controller associated with the selected scene.

21 Claims, 11 Drawing Sheets

(51) Int. Cl.
*F21V 23/02* (2006.01)
*H05B 37/02* (2006.01)
*H04L 29/08* (2006.01)
*G05B 19/04* (2006.01)
*G05B 19/02* (2006.01)

(52) U.S. Cl.
CPC ..... *H05B 33/0851* (2013.01); *H05B 33/0854* (2013.01); *H05B 33/0869* (2013.01); *H05B 37/0272* (2013.01); *G05B 19/02* (2013.01); *G05B 19/04* (2013.01); *H04L 67/025* (2013.01); *H04L 67/12* (2013.01)

(58) Field of Classification Search
USPC ............................. 700/11, 17, 20, 23, 27, 52
See application file for complete search history.

(56) References Cited

U.S. PATENT DOCUMENTS

| | | | |
|---|---|---|---|
| 9,241,392 B2 | 1/2016 | Chemel et al. | |
| 9,367,271 B2 | 6/2016 | Zehler et al. | |
| 9,730,298 B2 | 8/2017 | Vangeel et al. | |
| 9,730,302 B2 | 8/2017 | Vollmer et al. | |
| 2012/0299509 A1 | 11/2012 | Lee et al. | |
| 2013/0069542 A1 | 3/2013 | Curasi et al. | |
| 2013/0271001 A1 | 10/2013 | Kurachi et al. | |
| 2013/0271004 A1 | 10/2013 | Min et al. | |
| 2013/0346229 A1* | 12/2013 | Martin ................... | G06Q 40/00 705/26.3 |
| 2016/0091217 A1 | 3/2016 | Verberkt et al. | |
| 2016/0095189 A1 | 3/2016 | Vangeel et al. | |
| 2017/0034247 A1 | 2/2017 | Tredoux | |
| 2017/0086279 A1 | 3/2017 | Chemel et al. | |
| 2017/0171950 A1* | 6/2017 | Barna ................ | H05B 37/0272 |
| 2017/0264452 A1 | 9/2017 | Vollmer et al. | |
| 2017/0311418 A1 | 10/2017 | Vangeel et al. | |
| 2017/0359555 A1 | 12/2017 | Irani et al. | |
| 2018/0077778 A1 | 3/2018 | Vangeel et al. | |

* cited by examiner

METHOD AND SYSTEM FOR CONTROLLING FUNCTIONALITY OF LIGHTING DEVICES FROM A PORTABLE ELECTRONIC DEVICE

PRIORITY

This patent application is a continuation of U.S. patent application Ser. No. 15/786,274, filed Oct. 17, 2017, which is now U.S. Pat. No. 10,098,201 B1 issued on Oct. 9, 2018, the disclosures of which is fully incorporated into this document by reference.

BACKGROUND

This disclosure is related to a method and system for controlling functionality of light devices and in particular to a method and system for controlling light devices from a portable electronic device.

Modern lighting systems include many features that were not previously available to facility operators and users. For example, lighting systems that include light emitting diode (LED) luminaires or other types of luminaires may offer features such as: controllable dimming; color selection and color tuning; adjustment of other characteristics of emitted light such as color temperature or $D_{uv}$; control of the shape and/or direction of emitted light beams; and pre-programmed scenes or customized scenes that incorporate a set of pre-programmed features.

In facilities such as theaters, concert venues, sports fields and stadiums, and even in commercial buildings, the lighting needs can change frequently depending on who is using the facility at any given time. For example, a venue may be used for a convention or business meeting during the day and a concert or social event in the evening. A sports field may be used for a football or soccer game at one time of day and a lacrosse team practice at another time of day. However, lighting systems do not easily adapt to the needs of each user and event. Instead, lighting systems are typically set in a "fully on" or "fully off" arrangement unless the facility is staffed with technicians who can manually change the lighting system scenarios in response to new users' needs.

This disclosure describes methods and systems for controlling the functionality of a network of one or more lighting devices.

SUMMARY

A system for controlling one or more lighting devices in a lighting device control system includes a processor in communication with a portable electronic device and a memory device. The memory device contains programming instructions for a lighting system control application. The system transmits a set of available scenes for one or more gateway controllers to the portable electronic device. The gateway controller is communicatively coupled to one or more fixture controllers, and each fixture controller is connected to one or more lighting devices in a network of lighting devices. The system then receives a light operation request comprising a selected scene and a time duration from the portable electronic device, determines whether the portable electronic device is authorized to cause a gateway controller associated with the selected scene to implement the light operation request, and transmits the light operation request and an authorization token to cause the gateway controller to activate at least one lighting device according to the selected scene and the time duration if portable electronic device is authorized to cause a gateway controller associated with the selected scene to implement the light operation request.

In an embodiment, the light operation request is configured to, when received by the gateway controller, cause the gateway controller to initiate or maintain the at least one lighting device in a first condition at a first time, and then switch the at least one lighting device to a second condition when the time duration expires.

Before transmitting the set of available scenes for the one or more gateway controllers to the portable device, the system may receive from the portable electronic device, an identifier associated with one of the one or more gateway controllers, and may then transmit to the portable electronic device a set of available scenes for the gateway controller associated with the receiver identifier.

In some embodiments, the system may determine whether the portable electronic device is authorized to cause the gateway controller associated with the selected scene to implement the light operation request by receiving a user credential from the portable electronic device or the gateway controller, and verifying the user credential.

Alternatively and/or additionally, the system may determine whether the portable electronic device is authorized to cause the gateway controller associated with the selected scene to implement the light operation request by receiving a first account identifier from the gateway controller associated with the selected scene, receiving a second account identifier from the portable electronic device, determining user credentials by comparing the first account identifier with the second account identifier, and verifying the user credential information.

In some embodiments, the system may also receive, from the gateway controller, a signal indicating that the time duration is about to expire, and may receive, from the portable electronic device, a request to extend the time duration to an extended time. The system may then transmit, to the gateway controller associated with the selected scene, the request to extend the time duration so that the gateway controller may cause the at least one lighting device to continue to emit light that exhibits the settings for the selected scene through the extended time.

In at least one embodiment, before transmitting the set of available scenes for the one or more gateway controllers to the portable electronic device, the system may receive, from at least one of the one or more gateway controllers, an indication that the portable electronic device has paired with the at least one gateway controller.

In some embodiments, each of the one or more scenes may include a set of data corresponding to one or more optical characteristics of one or more lighting devices in the network. The one or more optical characteristics may include a brightness or dimming level, color temperature, color, $D_{uv}$, beam shape, and/or beam direction.

In some embodiments, the system may also detect geolocation data indicating a location of the portable electronic device, identify a group of the light-enabled facilities that are within a distance range from the location of the portable electronic device, transmit identifying information for the group of the light-enabled facilities to the portable electronic device, and receive a selection of one of the local light-enabled facilities to which to direct the light operation request from the portable electronic device. Transmitting the set of available scenes for one or more gateway controllers may include transmitting the set of available scenes associated with one or more gateway controllers of the selected local light-enabled facility. Optionally, the system may also include a database of data for a plurality of light-enabled facilities, and the system may identify the group of light-enabled facilities that are within a distance range from the portable electronic device by accessing the database and extracting identification data for light-enabled facilities having location data that is within the distance range of the location of the portable electronic device. For each of the light-enabled facilities in the group, the server may transmit at least one or more available lighting service schedules from the multiple lighting service schedules in the database to the portable electronic device to be output by the user interface of the portable electronic device, to indicate which of the light-enabled facilities are available at various times. The server may also receive, from the portable electronic device, a light operation request, which includes a selection of one of the light-enabled facilities in the group and data for optical characteristics of light to be emitted by lighting devices at the selected facility. The light operation request also may include a service time that corresponds to one or more available lighting service schedules for the selected light-enabled facility. The server may confirm that the portable electronic device is authorized to initiate the light operation request, and optionally to reserve the selected light-enabled facility at the selected service time. The server will then transmit the light operation request to the gateway controller for the selected light-enabled facility. Optionally, the server may also update the database to indicate that the selected facility has been reserved at the selected time.

DETAILED DESCRIPTION

Figure 1:
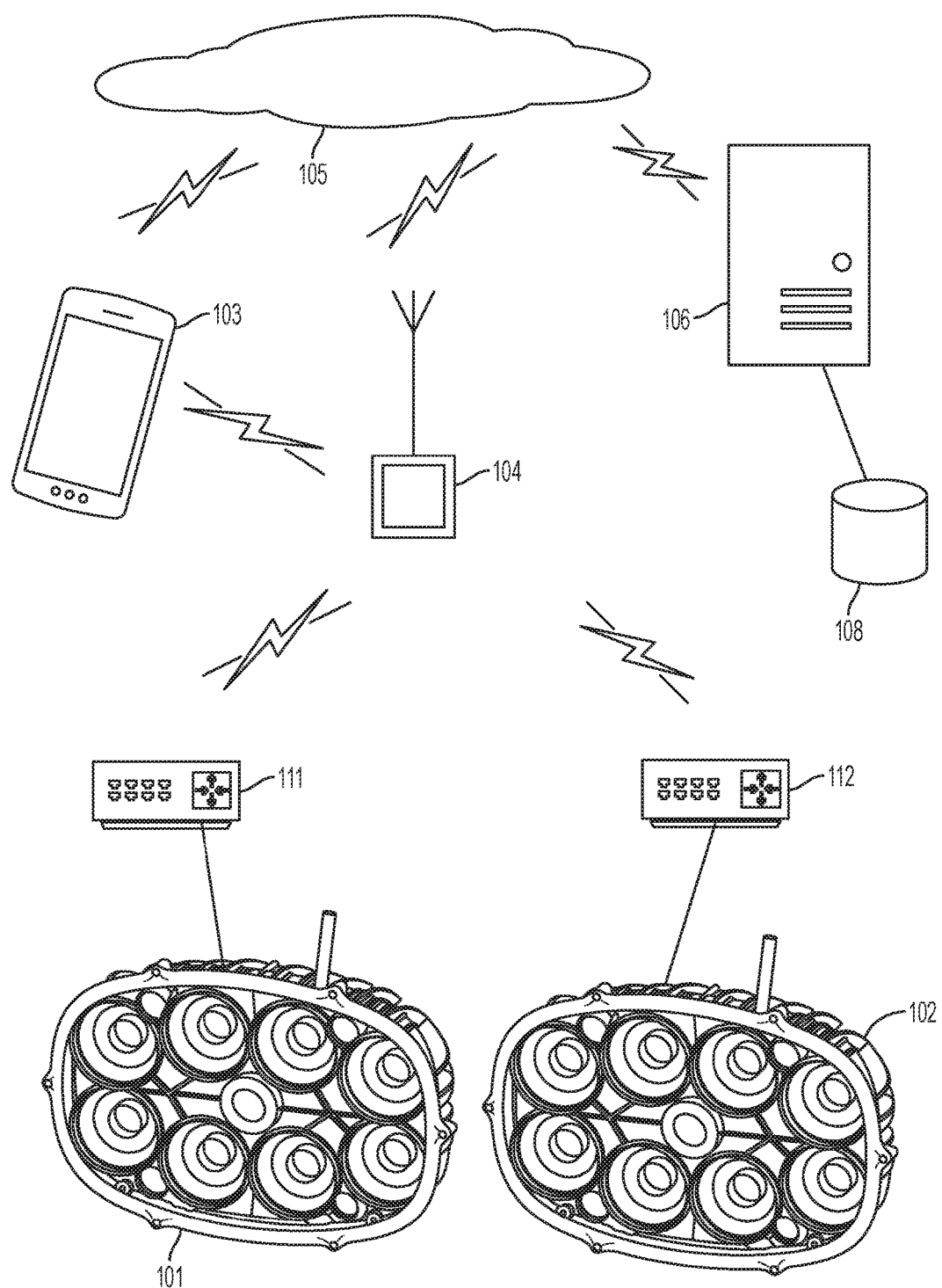
FIG. 1 illustrates an example of a network of lighting devices, with a proximate mobile electronic device and gateway controller that are used to control the light emitted by the network of devices.

As used in this document, the singular forms "a," "an," and "the" include plural references unless the context clearly dictates otherwise. Unless defined otherwise, all technical and scientific terms used herein have the same meanings as commonly understood by one of ordinary skill in the art. In this document, when terms such "first" and "second" are used to modify a noun, such use is simply intended to distinguish one item from another, and is not intended to require a sequential order unless specifically stated. As used in this document, the term "comprising" (or "comprises") means "including (or includes), but not limited to."

In this document, the terms "lighting device," "light fixture," "luminaire" and "illumination device" are used interchangeably to refer to a device that includes a source of optical radiation. Sources of optical radiation may include, for example, light emitting diodes (LEDs), light bulbs, ultraviolet light or infrared sources, or other sources of optical radiation. In the embodiments disclosed in this document, the optical radiation emitted by the lighting devices includes visible light. A lighting device will also include a housing, one or more electrical components for conveying power from a power supply to the device's optical radiation source, and optionally control circuitry.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

A "communication interface" of a gateway controller or other electronic device is a hardware element configured to enable the device to transmit and/or receive data signals from proximate devices and/or a communication network. Communication interfaces for communicating with proximate devices may include, for example, a short range wireless communication interface such as a transmitter, a near field communication (NFC) or radio frequency identifier (RFID) tag, or a Bluetooth™ or Bluetooth™ Low Energy (BLE) transceiver. Communication interfaces for indirectly communicating with proximate or non-proximate devices via one or more communication networks may include, for example, a wireless network card with wireless network antenna, a data port, or the like.

In this document, the terms "controller" and "controller device" mean an electronic device or system of devices configured to command or otherwise manage the operation of one or more other devices. For example, a fixture controller is a controller configured to manage the operation of one or more light fixtures to which the fixture controller is communicatively linked. A controller will typically include a processing device, and it will also include or have access to a memory device that contains programming instructions configured to cause the controller's processor to manage operation of the connected device or devices.

In this document, the terms "memory" and "memory device" each refer to a non-transitory device on which computer-readable data, programming instructions or both are stored. Except where specifically stated otherwise, the terms "memory" and "memory device" are intended to include single-device embodiments, embodiments in which multiple memory devices together or collectively store a set of data or instructions, as well as one or more individual sectors within such devices.

In this document, the terms "processor" and "processing device" refer to a hardware component of an electronic device (such as a controller) that is configured to execute programming instructions. Except where specifically stated otherwise, the singular term "processor" or "processing device" is intended to include both single processing device embodiments and embodiments in which multiple processing devices together or collectively perform a process.

A "computing device" or "electronic device" refers to an electronic device having a processor, a memory device, and a communication interface for communicating with proximate and/or local devices. The memory will contain or receive programming instructions that, when executed by the processor, will cause the electronic device to perform one or more operations according to the programming instructions. Examples of electronic devices include personal computers, servers, mainframes, virtual machines, containers, gaming systems, televisions, and portable electronic devices such as smartphones, wearable virtual reality devices, Internet-connected wearables such as smart watches and smart eyewear, personal digital assistants, tablet computers, laptop computers, media players and the like. Electronic devices also may include appliances and other devices that can communicate in an Internet-of-things arrangement, such as smart thermostats, home controller devices, voice-activated digital home assistants, connected light bulbs and other devices. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container may also be considered to be an electronic device. In the discussion below, a client device, server device, virtual machine or container may be referred to simply as a "device" for brevity. Additional elements that may be included in electronic devices will be discussed below in the context of FIG. 8.

FIG. 1 illustrates a lighting system in which any number of lighting devices 101, 102 are positioned at various locations in an environment, such as a wall, ceiling, mast, tower or other supporting structure in a stadium, arena, concert hall, outdoor amphitheater, park or other sports or entertainment facility, or a commercial building or other light-enabled facility. The lighting system also includes a gateway controller 104 communicatively coupled to one or more fixture controllers 111, 112 that are connected to one or more lighting devices 101, 102. Gateway controller 104 is configured to pair with a portable electronic device 103, receive a light operation request from the portable electronic device 103 and control at least one lighting device 101, 102 via the fixture controller 111, 112 according to the light operation request. Each of the gateway controller 104 and portable electronic device 103 may be capable of communicating with a communication network 105, such as a cellular communication work, an Internet, a mesh network or other wired or wireless communication networks. The fixture controller 111, 112 includes various components of an illumination device's control circuitry.

A remote server 106 also may be communicatively connected to the communication network 105 so that it can communicate with the portable electronic device, gateway controller, and/or fixture controllers. The remote server 106 may include or be connected one or more memory devices that collectively store a database 108 of data for multiple light-enabled facilities, such as scheduling data, data about available lighting devices and optional functions, available scenes, costs of various services and other data. The portable electronic device 103 may include a memory device containing programming instructions that are configured to cause the portable electronic device to perform various functions. In addition, or alternatively, the portable electronic device 103 may access the remote server 106 via a communication network 105 to obtain programming instructions that are stored on and received from and/or executed by the remote server.

Figure 2:
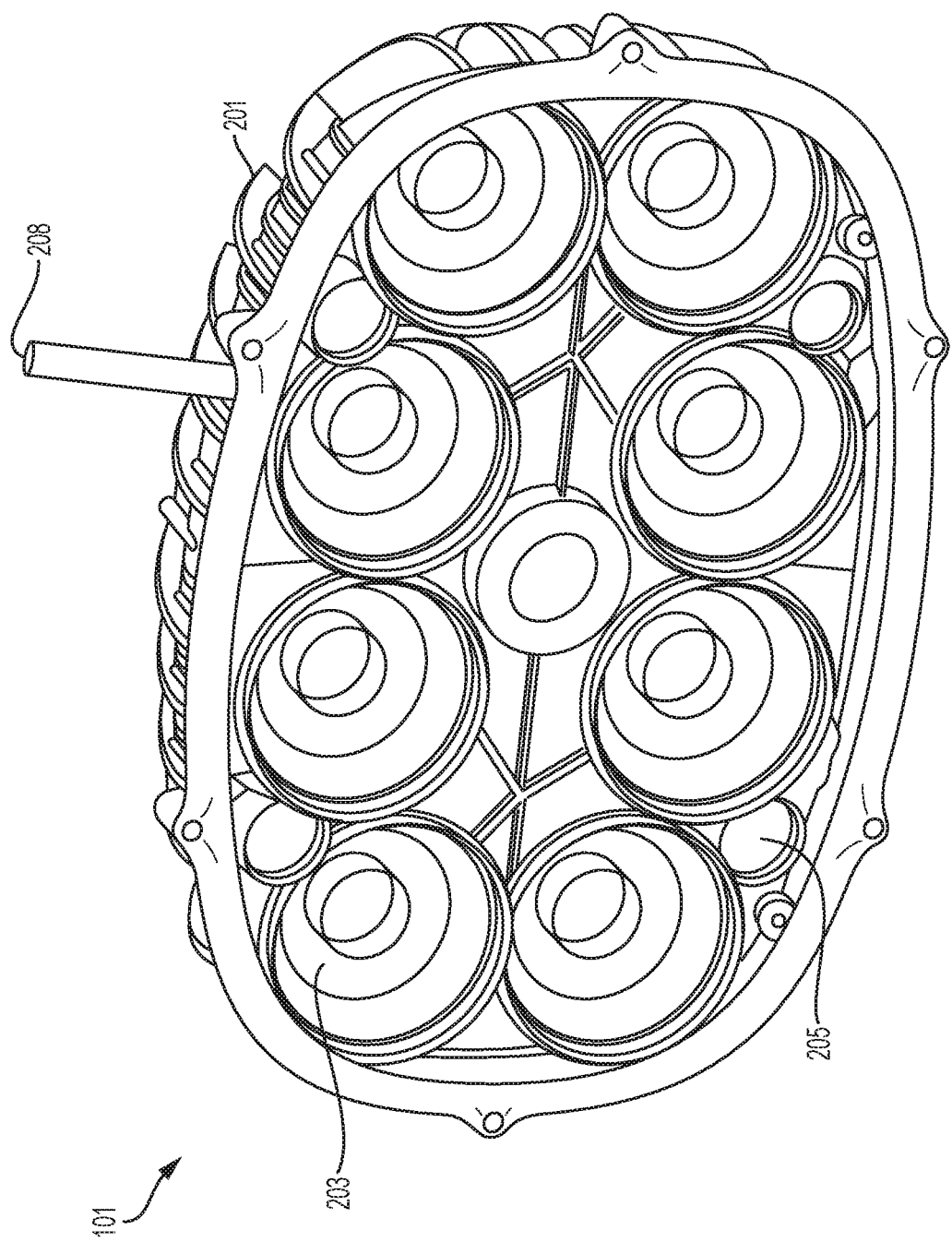
FIG. 2 illustrates an example of a lighting device that may be used with a network of lighting devices.

Referring to FIG. 2, an example lighting device 101 includes an optical radiation source, such as any number of lighting modules that include LEDs, and in various embodiments a number of LED modules sufficient to provide a high intensity LED device. In various embodiments, a lighting device may include multiple types of LED modules. For example, a lighting device may include a first type of LED module 203 having LEDs that are configured to selectably emit white light of various color temperatures, along with a second type of LED module 205 having LEDs that are configured to selectably emit light of various colors. The lighting device 101 may include a housing 201 that holds electrical components such as a fixture controller, a power source, and wiring and circuitry to supply power and/or control signals to the LED modules. A fixture controller may also be an external device to the lighting device.

Figure 4A:
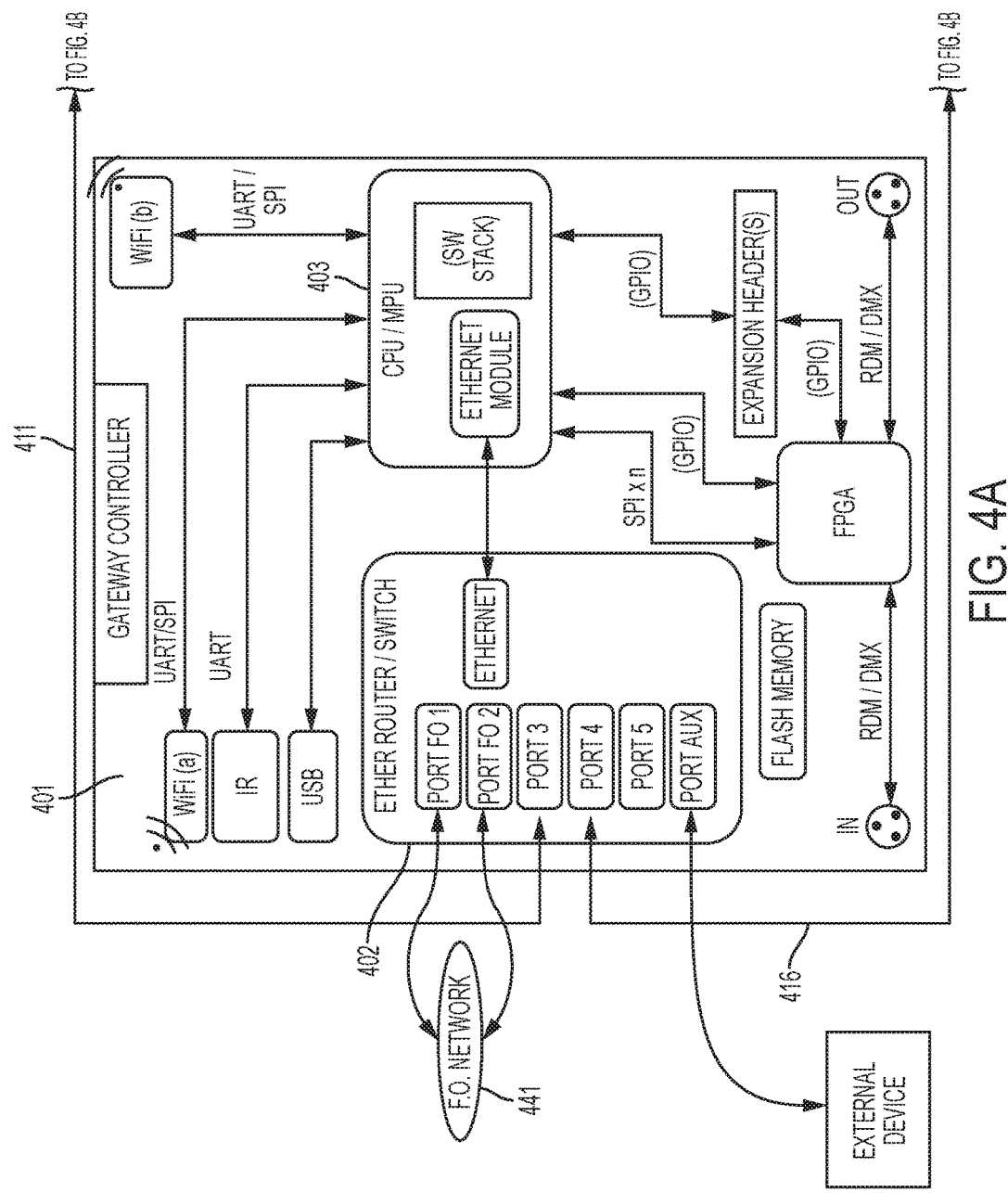
FIGS. 4a and 4b illustrate example components of a gateway controller and one or more fixture controllers of a lighting device.
Figure 4B:
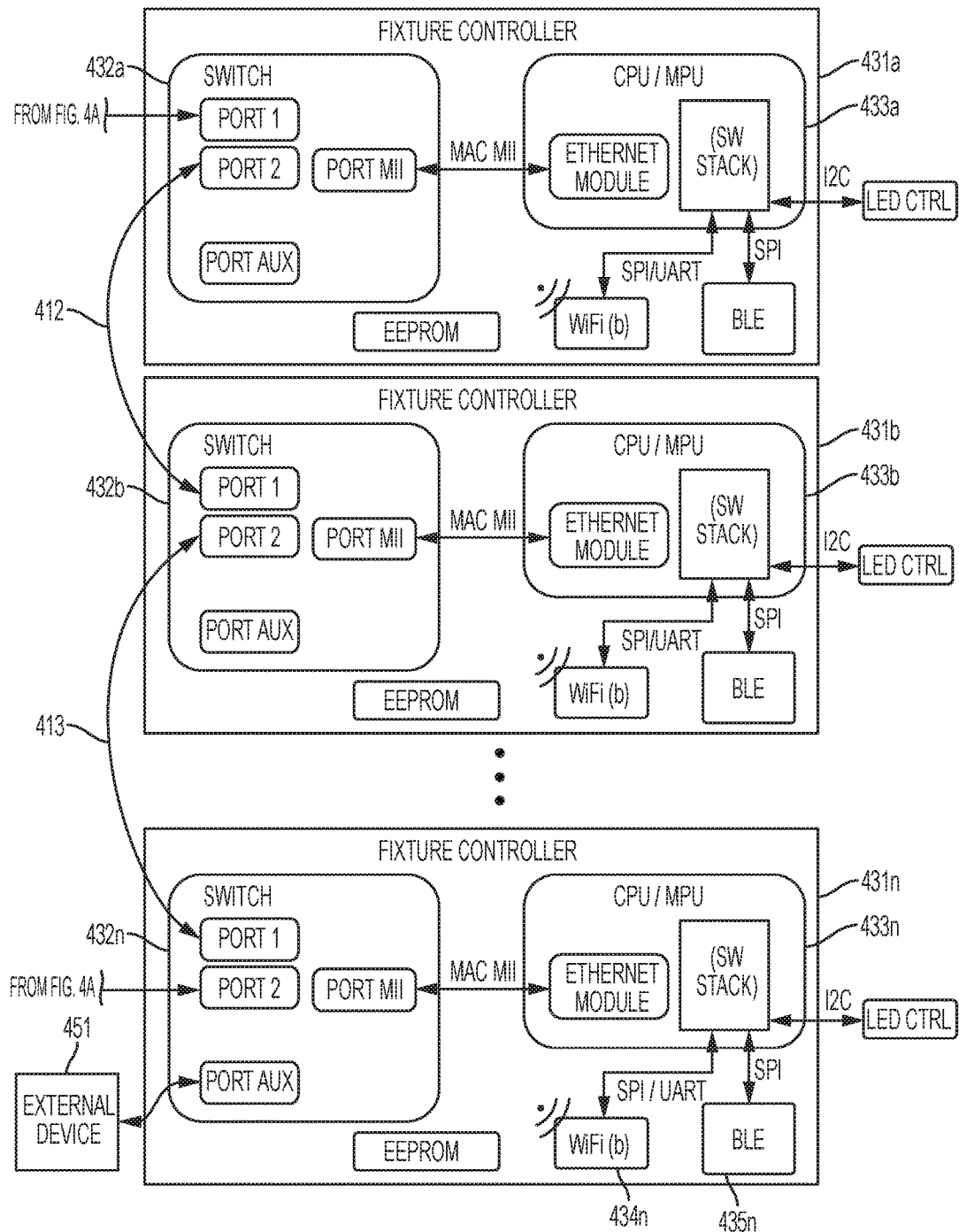

In FIGS. 4a and 4b, example components of a gateway controller 401 and one or more fixture controllers 431a, . . . 431n are shown. In this document, the term "gateway controller" refers to a central controller device that receives commands from a remote electronic device and routes the commands to appropriate lighting device fixture controllers in a network of lighting devices. The gateway controller 401 may include a processor 403 and a communications interface that includes a router or switch 402 with one or more Ethernet ports or optical fiber connectors configured to receive an Ethernet and/or fiber-optic cable. Other types of cables and connectors may be used, but for purposes of this disclosure Ethernet and fiber-optic cables and connectors will be used as examples.

Each fixture controller 431n also includes a processor 433n and, in wired connection embodiments, a switch 432n having at least two ports that are each configured to receive an Ethernet or fiber-optic cable. With the ports described above as start and end points, the gateway controller 401 is connected via a communication link 411, such as an Ethernet or fiber-optic cable, to form a connection to at least one of the fixture controllers 431a. Alternatively, and/or additionally, the communication link 411 may also be a wireless communication link such as a Wi-Fi, a Bluetooth, a NFC network, a mesh network or other communication links.

Optionally, each fixture controller may be directly communicatively connected to the gateway controller 401. Each fixture controller (e.g., 431a) may also be similarly connected to at least one other fixture controller (e.g., 431b) via a serial communication link 412, 413 (in this embodiment, an Ethernet or fiber-optic cable) in a daisy chain configuration. In this way, the first fixture controller 431a in the chain may be connected to the gateway controller 401 and a next fixture controller according to a ring topology. The next fixture controller 431b may be connected to the previous fixture controller 431a and a next fixture controller in the chain until a final fixture controller 431n is reached. The final fixture controller 431n also may be connected to the gateway controller via a serial communication link 416. In this way, the gateway controller 401 may send commands to each of the lighting device's fixture controllers via the various communication links, and the gateway controller 401 may receive data from each of the lighting device's fixture controllers via the various communication links. In some embodiments, communication may be in a single direction around the loop formed by the devices and communication links; in other embodiments communication may be bidirectional in both the clockwise and counterclockwise directions around the communication links. The ring topology shown in FIGS. 4a and 4b is optional, and other configurations such as a hub-and-spoke configuration (in which the gateway controller is the hub) or a mesh network may be used.

Any of the lighting device fixture controllers (e.g., 431n) may be connected to one or more external devices 451, such as a camera or computing device. This connection may be via a wired connection through an Ethernet or other type of switch 432n as shown in FIG. 4b, or it may be a wireless connection via a wireless receiver such as a Wi-Fi receiver 434n or a short-range communication receiver 435n such as a receiver configured to receive signals via a Bluetooth™ Low Energy or other communications protocol.

As noted above, the gateway controller 401 also may be communicatively connected to the remote server (106 in FIG. 1) and portable electronic devices (103 in FIG. 1) via one or more communication interfaces to networks such as a fiber optic network 441, and/or a wireless communication network such as a local area network, cellular network and/or the Internet.

Each lighting device will have an associated address, such as an Internet Protocol address. When sending control data to the lighting devices, the gateway controller may designate the data to be used by all devices, by a group of the devices, or by individual devices. As each device receives data, its fixture controller may examine the data to determine whether that data is intended for it. Alternatively, a gateway controller may be configured to be in a "pass-through" mode where it will forward any received data directly to lighting devices for any further processing. One way in which this may be done is that the gateway controller may associate one or more device addresses with each set of data. For example, the gateway controller may send a start data signal, one or more device addresses, and a control data set. If a device detects (based on the device address that follows the start signal) that a data set is intended for that device, it may receive and apply that data until the stop command is received. Each device will also pass the data along to the next interconnected device in the network via the Ethernet or fiber-optic cable.

Optionally, one or more of the lighting devices may add data to the data stream before passing the data stream along to a next device. For example, any lighting device's fixture controller 431b may receive data from one or more external or internal sensors, as described above. The fixture controller may append its device's address to the data stream, so that the data is passed through all lighting devices in the chain and the fixture controller of the final device 431n in the chain will pass the data on to the gateway controller 401.

When an external device 451 (such as a camera) is connected to any lighting device's Ethernet switch, the external device also may have an associated address, and the gateway controller 401 may send data to the external device using the external device's address and the wired network described above. Similarly, the fixture controller 431n to which any external device 451 is attached may send data from the external device to the gateway controller 401 via the data stream just as it may do with any other data as described above.

Several of the communication links shown in FIGS. 4a and 4b are labeled with communication protocols that may be used to transmit data across the links. Those labels are by way of example only; other communication protocols may be used with any or all of the links shown. In addition, in various embodiments, the gateway controller 401 may include programming configured to translate control data received from a first protocol into a second protocol that is compatible with the lighting devices to which the gateway controller will send commands. In this way, the gateway controller 401 serves as a universal protocol gateway between the lighting devices and one or more external devices or systems. For example, the gateway controller 401 may translate data received from the portable electronic device in a NFC communication protocol or other wireless protocol (such as Bluetooth™ Low Energy), whereas the gateway controller 401 may communicate with the remote server (106 in FIG. 1) in an Ethernet protocol, and/or it may translate data received and/or it may translate data received in a fiber channel protocol, and/or it may translate data that it receives via other protocols, into a communication protocol that is compatible with that of the illumination devices, such as $I^2C$ or that described in the American National Standards Institute ("ANSI") "Entertainment Technology—USITT DMX512-A—Asynchronous Serial Digital Data Transmission Standard for Controlling Lighting Equipment and Accessories", which is commonly referred to a DMX512 or simply DMX. This document will use the term "DMX" to refer to the DMX512 standard, and its various variations, revisions and replacements, including any future revisions or replacements that may be consistent with the processes described in this disclosure.

Returning to FIG. 1, gateway controller 104 may communicate with a proximate portable electronic device 103 via a direct or indirect communication link. The gateway controller 104 may communicate with one or more fixture controllers 111, 112 or any number of fixture controllers, each connecting to one or more lighting devices 101, 102. The gateway controller 104 as well as the proximate portable electronic device 103 may communicate with the remote server 106 by any number of communication links. The remote server 106 may be a cloud-based server that communicates with the other devices via the communication network 105.

Figure 3:
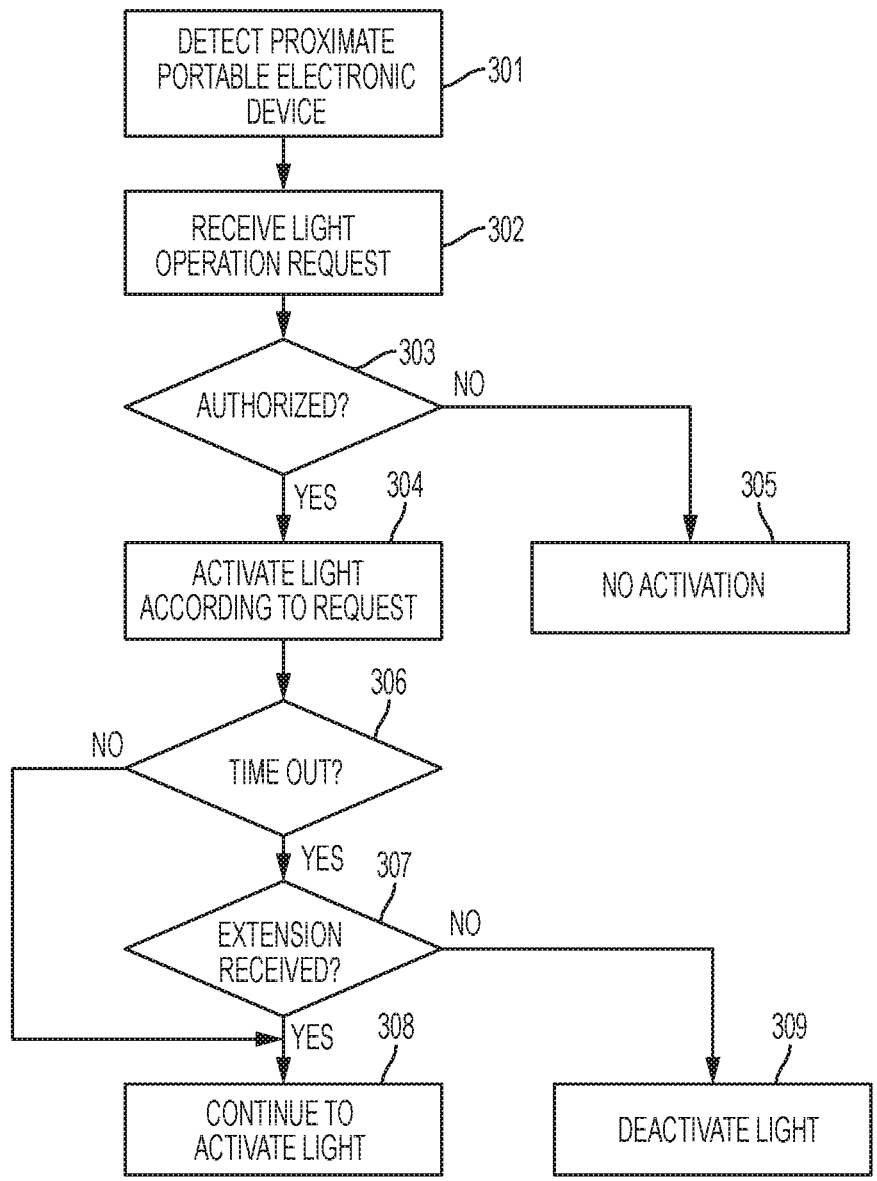
FIG. 3 illustrates example steps that a gateway controller may take when being used to control a lighting device.

FIG. 3 is a flow diagram illustrating a method of controlling one or more lighting devices in a system such as that disclosed above. The gateway controller may detect 301 that a portable electronic device on which a lighting control application is installed is proximate to the lighting device. Devices are "proximate" to each other if they are within a communication range of each other on a local area network or using a short-range communication or NFC communication protocol.

Short-range communication transceivers are devices that directly communicate with each other via relatively short distances on the order of 100 meters or less, or 10 meters or less. Examples of short-range transceivers include those that adhere to short-range communication protocols such as ZigBee®, Bluetooth®, and Bluetooth® Low Energy (BLE) transceivers, and/or via infrared (IR) light transceivers. NFC transceivers are ultra-short range transceivers that adhere to one or more standards for radio frequency communications that may be used when two devices are in close proximity, and may include hardware elements such as loop antennas that exchange information via electromagnetic induction. Protocols for implementation of NFC may comply with industry standards such as ISO/IEC 18092 or ISO/IEC 18000-3, published by the International Standards Organization. Typical ranges for near field communications are approximately 10 cm or less, although it may be 20 cm or less, 4 cm or less, or other ranges. By receiving a connection request via a short-range communication protocol or NFC protocol, the gateway controller will thus detect that the mobile electronic device is proximate to the lighting device.

Detection 301 of proximity may occur, for example, by receiving a connection request from the portable electronic device via a short-range communication or NFC transceiver. Alternatively, the detection 301 may occur by receiving a connection request from the portable electronic device via a known wireless local area network (WLAN), such as a Wi-Fi network that has a limited range and to which the lighting device is also communicatively connected. By receiving a connection request from a mobile electronic device that is communicatively connected to the same WLAN to which the gateway controller is connected, the gateway controller will thus detect that the mobile electronic device is proximate to the gateway controller.

The gateway controller will also receive, via the communication interface, a light operation request 302 from the portable electronic device. The communication may occur directly from the portable electronic device via short-range or NFC communication, or indirectly such as via the remote server and one or more networks. The light operation request will be one or more data packets that include one or more settings for one or more optical characteristics of light that the optical radiation source of the lighting device and/or other communicatively connected lighting devices may emit. The one or more optical characteristics comprise may include settings such as a brightness or dimming level, color temperature, color, $D_{uv}$, beam shape, and/or beam direction of the light emitted by the optical radiation source.

The gateway controller may determine whether the portable electronic device is authorized to cause the gateway controller to implement the light operation request 303. If the gateway controller determines that the portable electronic device is authorized to initiate the light operation request, it will activate one or more lighting devices by causing the optical radiation source of each lighting device to emit light that exhibits the one or more optical characteristics of the light operation request 304. If the gateway controller determines that the portable electronic device is not authorized to initiate the light operation request, it will not implement the request and thus not activate the optical radiation source according to the request 305.

To determine whether the portable electronic device is authorized to cause the gateway controller to implement the light operation request 303, the gateway controller may determine whether the portable electronic device is associated with a valid unlock token for the light operation request. A valid unlock token is a digital identifier that the gateway controller knows represents authorization to activate or change one or more characteristics of emitted light, such as a code or authentication token. The gateway controller may receive the unlock token from the portable electronic device with the light operation request and compare the token with a set of locally or remotely stored authentication tokens to determine whether the received token matches a known valid token or adheres to a valid token standard. Alternatively, the gateway controller may receive an account identifier for the portable electronic device, transmit the account identifier to a remote server so that the remote server can perform the authentication, and receive the unlock token from the remote server if the remote server determines that the portable electronic device is authorized to initiate the light operation request. Alternatively, if the light authorization request is sent to the gateway controller from a remote server, the remote server may send the unlock token to the gateway controller.

Upon determining that the portable electronic device is authorized to submit the light operation request, the gateway controller may activate one or more lighting devices according to the selected the one or more optical characteristics in the light operation request 304. For example, the gateway controller may send command(s) to the one or more lighting devices to cause each lighting device's optical radiation source to emit light that exhibits the optical characteristics values of the light operation request. The fixture controller associated with each lighting device will implement one or more commands to control operation of the optical radiation source.

Example methods for altering optical characteristics of LED lights are disclosed in, for example: (i) U.S. Pat. No. 9,188,307 to Casper et al., titled "High Intensity LED Illumination Device with Automated Sensor-Based Control"; (ii) U.S. Pat. No. 9,189,996 to Casper et al., titled "Selectable, Zone-Based Control for High Intensity LED Illumination System"; (iii) U.S. patent application Ser. No. 15/670,659, filed by Nolan et al. and titled "Lighting Device LED Module with Effects for Color Temperature Tuning and Color Tuning"; and (iv) U.S. patent application Ser. No. 15/670,671, filed by Nolan et al. and titled "Lighting Device LED Module with Effects for Beam Spread Tuning and Beam Shaping." The disclosures of each of these patents and patent applications are fully incorporated into this document by reference.

The optical characteristics may include a scene, which is a set of data corresponding to lighting device settings that will yield various optical characteristics of the emitted light for a group of networked lighting devices. For example, a scene may correspond to a type of a sport, such as football, soccer, basketball, tennis, table tennis or any other sports. A scene may also correspond to a type of event, such as a dance party, a birthday party, a lecture, a game or a social event. Each scene may include a set of data corresponding to one or more optical characteristics of at least one of the networked lighting devices. For example, a scene for playing football in a football field may include data that corresponds to full illuminance setting for all of the lights around the football field. In another example, a scene for ice skating in an arena may include data that correspond to certain lights at full illuminance and certain light at a dimmed level. Alternative scenes for the arena may include scenes for a basketball game or music concert. In another example, a scene for a lecture in a lecture hall may include data that correspond to a spotlight above the podium at full illuminance and other lights in the lecture hall at a dimmed level. In another hall, available scenes for a gymnasium may include options for: (i) a game scene in which all lights in the gym are illuminated at their highest level; (ii) a practice scene in which only lights directed to the court are lighted at a full illuminance level while lights directed to spectator areas are operated at a reduced illuminance level (i.e., dimmed); and (iii) a half-court scene in which lights directed to a first half of the court are operated full illuminance while lights directed to the second half of the court are operated at a lesser illuminance level. Optionally, a scene may include some setting values will change over time. If so, then the scene may include instructions for the gateway controller to cause the values of those optical characteristics of the emitted light to change over time according to the scene.

Optionally, the light operation request may include a time duration. The time duration is a data point indicative of a numeric start time, stop time and/or or a duration for activation of one or more characteristics of the optical radiation source. If so, then when activating one or more lighting devices according to the selected scene and the time duration, the gateway controller will initiate or maintain the optical radiation source of the lighting devices in a first condition (such as "on") according to the selected characteristics at a first time, via the fixture controller associated with each lighting device. Then when a time out condition occurs 306 corresponding to expiration (i.e., the off time or the end of the duration), the gateway controller will cause the lighting devices to transition to a second operating condition by deactivating the optical radiation source and/or the selected characteristics 309. Deactivation may include, via the fixture controller associated with each lighting device, completely turning the light off, or returning the light to a default setting that does not include all of the selected characteristic values of the light operation request. Optionally, the gateway controller may receive an extension request 307 from the mobile electronic device before the time expires. The extension request will include a new (and later) stop time or an extension to the duration. If the gateway controller determines that the mobile electronic device is authorized to extend the time of operation according to the extension request (using authorization procedures such as those described above), the gateway controller will continue to activate the optical radiation source 308 with the requested characteristic values until the extended time expires, at which time the fixture controller will deactivate the light as described above.

Figure 5:
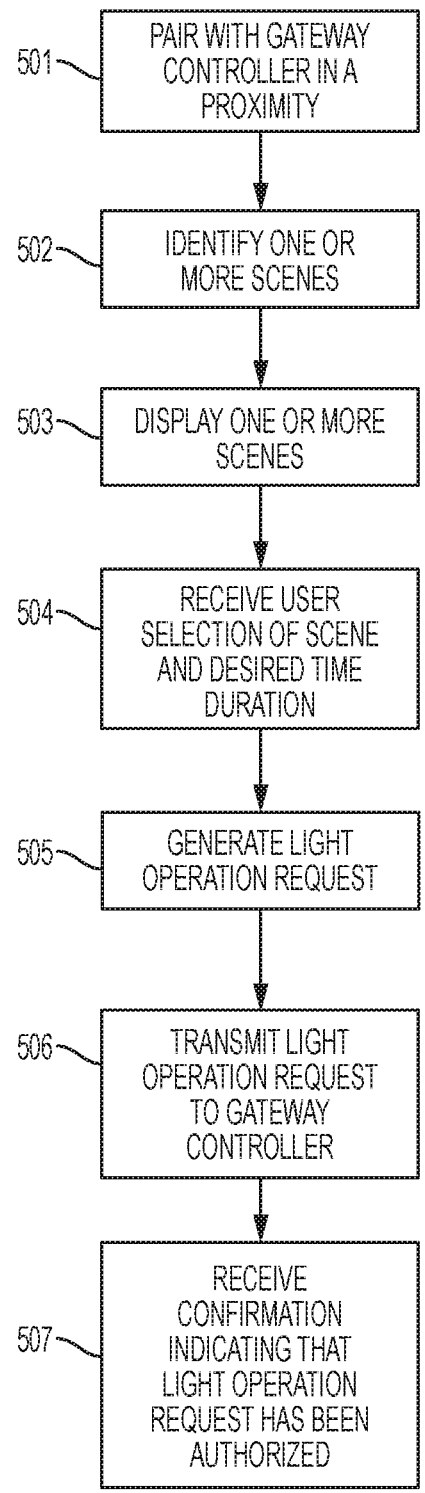
FIG. 5 illustrates example steps that a portable electronic device may take when being used to control a lighting device.

Now, with reference to FIG. 5, an example of a diagram of a process in the portable electronic device and/or other components of the system is further explained. A portable electronic device may include a processor and a display having a user interface. The portable electronic device may include or have access to a non-transitory computer readable medium containing the programming instructions. The programming instructions, when executed, may cause the processor to: pair (and/or detect that the portable electronic device has paired) with a gateway controller in proximity to the portable electronic device 501; identify one or more scenes 502; cause the user interface to display the one or more scenes 503; receive, via the user interface, a user selection of a scene from the one or more scenes and a desired time duration 504; generate or otherwise identify a light operation request comprising the selected scene and the time duration 505; and transmit the light operation request to the gateway controller to cause the gateway controller to activate at least one of the one or more lighting devices according to the selected scene and the desired time duration 506.

In identifying the one or more scenes 502, in some scenarios, the portable electronic device may receive the scenes from the gateway controller after pairing with the gateway controller. For example, each gateway controller may store one or more available scenes that correspond to a type of sport or event suitable for the lighting devices that are installed at the premises where the gateway controller is installed and controlled by the gateway controller. Upon pairing with a proximate gateway controller, a portable electronic device may receive data about the available scenes from the gateway controller and display these scenes on its display for user selection. Alternatively, upon pairing with a gateway controller, the portable electronic device may transmit an identifier of the gateway controller to a remote server, which may responsively return a set of available scenes for the identified gateway controller. In another alternative embodiment (explained in more detail below in FIG. 8) the portable electronic device may receive, from a remote server, available scenes for multiple gateway controllers located in a geographic area.

As illustrated above, the gateway controller may first determine whether the portable electronic device is authorized to initiate the light operation request before activating one or more lighting devices according to the selected scene and the time duration. Upon determining the light operation request has been authorized, the gateway controller may transmit a message indicating such authorization to the portable electronic device. Correspondingly, the portable electronic device may be configured to receive a message from the gateway controller and cause the user interface to output a confirmation message indicating that the light operation request has been authorized 507.

To determine whether a light operation request is authorized, in some scenarios, the gateway controller may determine whether the portable electronic device has provided valid user credential information, such as user account identification information and/or user password. The portable electronic device may transmit such user credential information to the gateway controller, which in turn transmits the same credential information to the remote server for authorization.

Alternatively, the portable electronic device may directly communicate with the remote server and transmit the user credential to the remote server via an encrypted connection, such as the secure sockets layer (SSL) protocol, in which case the remote server may signal to the gateway controller or the remote electronic device that the light authorization request is authorized. In addition, the portable electronic device may also include the account identifier associated with the portable electronic device in the user credential data.

If the authorization is given to the gateway controller by the remote sever or portable electronic device, then the gateway controller may wait to receive the authorization before the gateway controller will send commands to cause any of its networked lighting devices to implement the light operation request. If the authorization is given to the portable electronic device controller by the remote sever or the gateway controller, then the portable electronic device may wait to receive the authorization before it will send the light operation request to the gateway device.

In a non-limiting example, a remote server may be configured to receive the credential data from the portable electronic device, where the credential data includes the account identifier. When a gateway controller communicates with the remote server to request authorization of a light operation request from a portable electronic device, the gateway controller transmits data in the light operation request and the account identifier associated with the portable electronic device that initiated the light operation request. Upon receiving the light operation request and account identifier from the gateway controller, the remote server compares the account identifier it received from the gateway controller with the account identifier received from the portable electronic device directly, to determine the corresponding user credential information associated with the account identifier. Then the remote server uses the user credential information to determine whether the light operation request is authorized. Upon determining that the light operation request is authorized, the remote server may transmit to the gateway controller a confirmation message indicating that the portable electronic device is authorized to initiate the light operation request. Subsequently, the gateway controller may transmit the confirmation message to the portable electronic device.

Optionally, a light operation request may include a command to operate a single lighting device, multiple lighting devices, or all lighting devices in a system that is communicatively connected to the gateway controller. For example, the light operation request may include one or more settings for one or more optical characteristics of light that a first lighting device may emit and different settings for optical characteristics of light emitted by a second lighting device. To do this, the light operation request may include an identifier for each lighting device to which commands will be directed, such as an address of the lighting device, or it may include a general command such as "apply the light operation request to all connected lighting devices."

Figure 6:
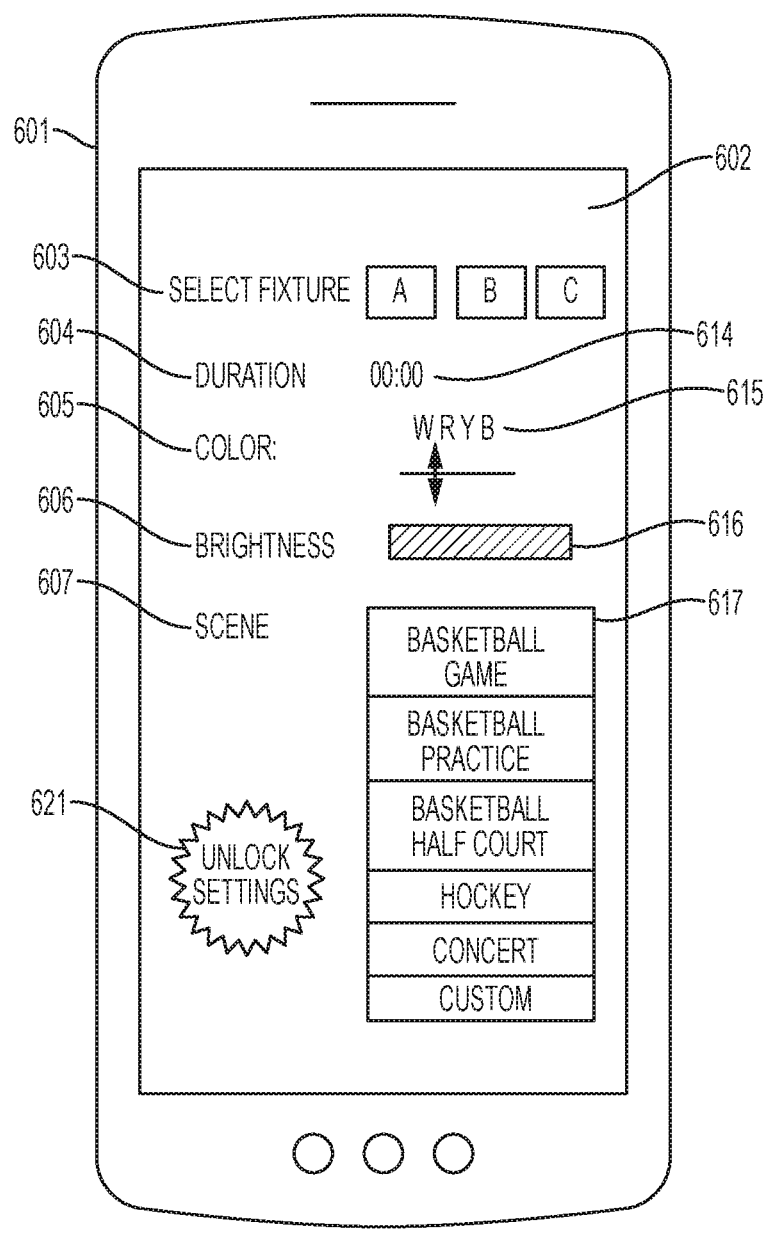
FIG. 6 illustrates an example of a portable electronic device user interface that may be used to control the light emitted by one or more lighting devices.

FIG. 6 illustrates an example portable electronic device 601 with user interface 602. The user interface 602 may be a touch-sensitive display device. In other embodiments, instead of or in addition to the display the user interface may include other user input/output hardware such as a microphone and/or audio speaker, a keyboard or keypad, or another user interface device. The user interface 602 may include a fixture selector 603 via which the user may select one or more lighting devices to control, and a time selector 604 via which a user may enter a time duration 614 that may include a start time, stop time or duration. (Alternatively, the system may identify a default time duration, which may be part of a scene or part of other programming instructions.) The user interface 602 also may include any number of lighting characteristics selectors 605, 606 via which the user may enter values for one or more user-selectable settings for characteristics of the light to be emitted by the selected lighting device(s). The system may display various candidate user-selectable settings 615, such as a data entry field, a list of options or another selector, for characteristics that the user is authorized to select. For any settings that are locked for the user's account (i.e., not yet unlocked because the user is not yet authorized to implement the settings), the user-selectable settings 616 may be displayed in a non-selectable format, such as a shield or overlay, or in a greyscale or other format that is not actuatable by the user until the user unlocks the setting. The user interface also may include an actuator 621 via which the user may unlock the setting, such as a purchasing interface by which a user may purchase access to the relevant feature.

Optionally, the user interface may include a scene selector 607 via which the user may select a scene that includes a set of one or more characteristics for one or more lights, in which the setting value for at least some of the characteristic(s) will change over time. The available values 617 may include pre-defined scenes, or the system may provide a scene creator user interface via which the user may select the settings, lighting devices and times that will define a new scene or adjust a pre-defined scene.

Figure 7:
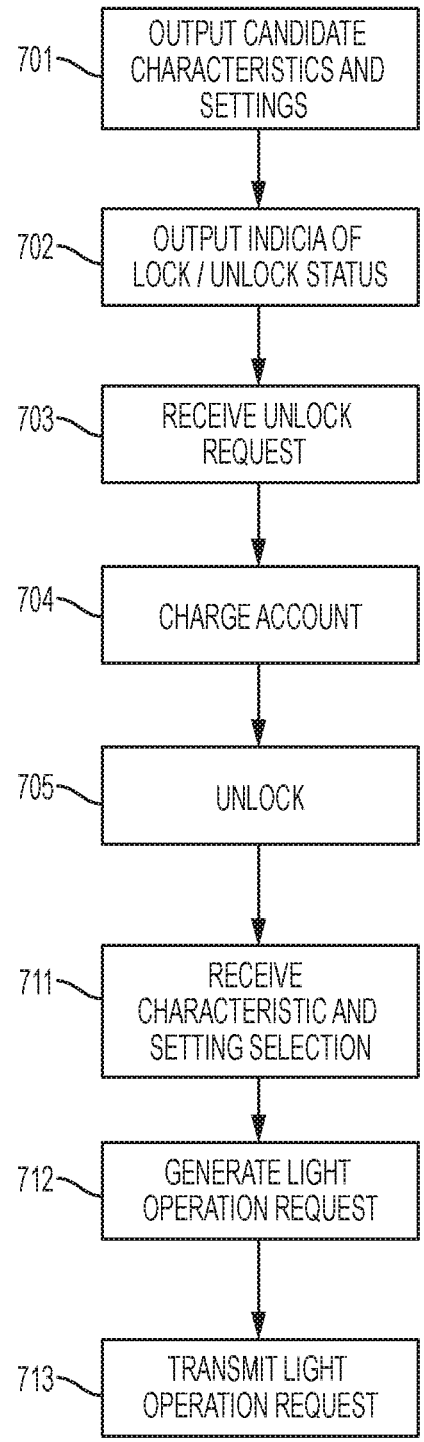
FIG. 7 illustrates example steps that a portable electronic device may take when being used to control a lighting device.

FIG. 7 illustrates a process that a portable electronic device may follow to initiate a light operation request for one or more proximate lighting devices. The portable electronic device may include a user interface that outputs various candidate optical characteristics for the optical radiation source 701. For at least some of the candidate optical characteristics, the user interface may also display user-selectable settings. The system also may output lock/unlock (as discussed in FIG. 6) status indicia 702 of whether an account associated with portable electronic device or its user has unlocked the ability to select settings for each characteristic. For example, for characteristics that are not locked, user-selectable settings may be presented in a user-selectable format, such as a data entry field, list, or other structure. Characteristics for which user-selectable settings that are locked will not be displayed in a user-selectable format, and may be displayed in grayscale, in shielded format, or with other indicia showing that they are locked, or they may not be displayed at all.

For any characteristic that is locked, the user may input (and the portable electronic device may receive via the user interface) an unlock request 703 and transmit the unlock request to the gateway controller. If so, the gateway controller may generate and transmit to a remote server a command to charge a user's account an amount required to unlock the setting 705. Upon receiving confirmation from the remote server that the account has been charged, the gateway controller may send to the portable electronic device an unlock code, e.g., an unlock token, to unlock 705 the characteristic so that the user can select the value of that characteristic's setting. Alternatively, and/or additionally, the portable electronic device may directly send the unlock request to the remote server and receive an unlock code from the remote server.

When the portable electronic device receives, via the user interface, a selection of at least one of the candidate optical characteristics and a value for an associated setting for each selected optical characteristic 711, it will generate a light operation request 712 as data comprising each of the one or more selected optical characteristics and its associated setting's value and an account identifier. The portable electronic device will then transmit 713 the light operation request to the gateway controller via an NFC or short range communication protocol.

Figure 8:
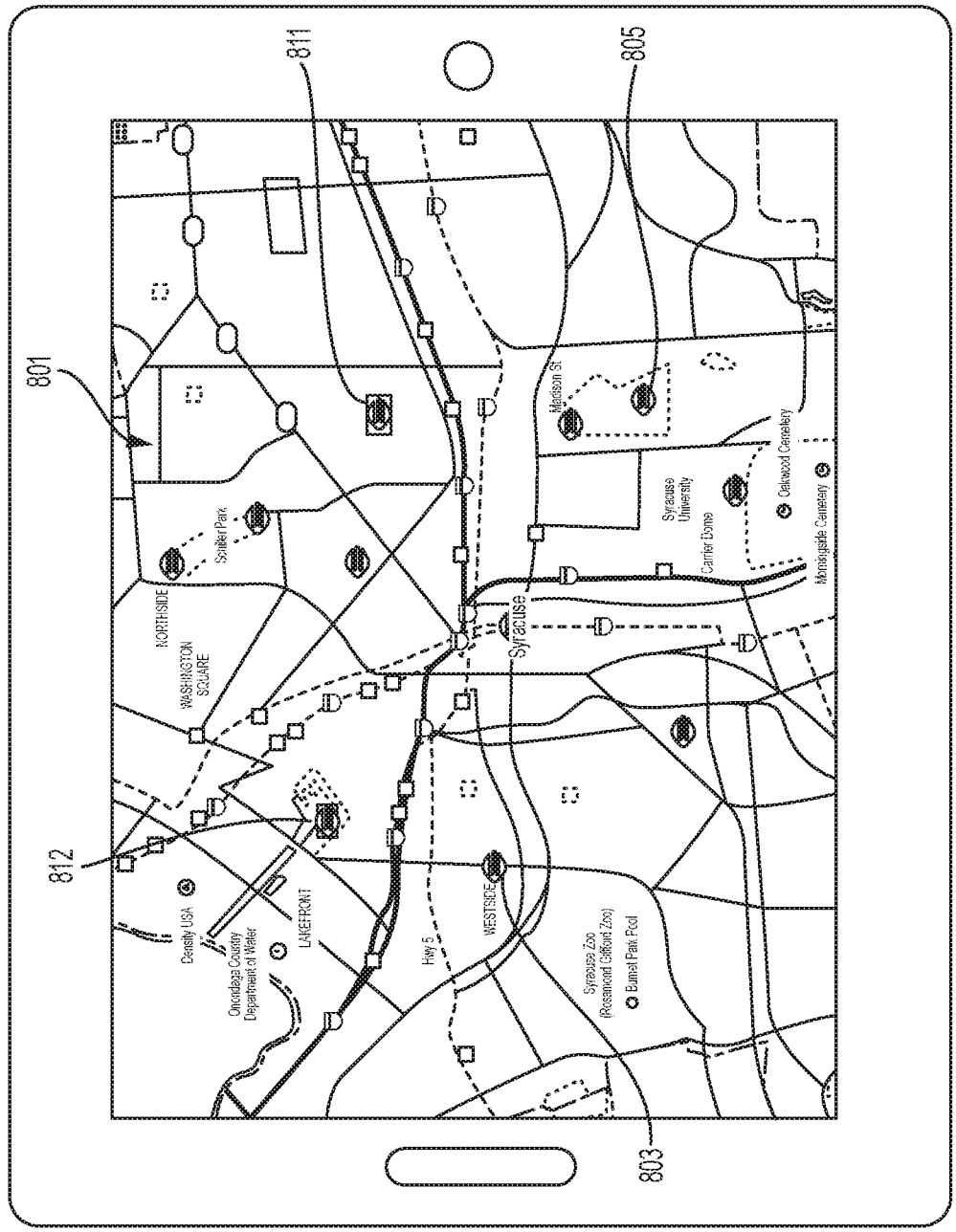
FIG. 8 illustrates an example user interface by which a user may schedule lighting service at any of a plurality of facilities in a geographic region.

FIG. 8 illustrates a user interface 801 that may be used to schedule lighting services at any of a group of lighting-enabled facilities in geographic region that is proximate to the portable electronic device. Various lighting facilities 803, 805, 811, 812 are represented on the map by location. Alternatively, available lighting facilities may be represented in a list or other format, optionally with identifying information describing the types of light-enabled locations that are available at the facility (e.g., basketball court, hockey rink, baseball field, soccer/lacrosse field, and the like). Each of the facilities shown in the user interface is light-enabled in that it will include a gateway controller and lighting devices as previously described in this document.

Figure 9:
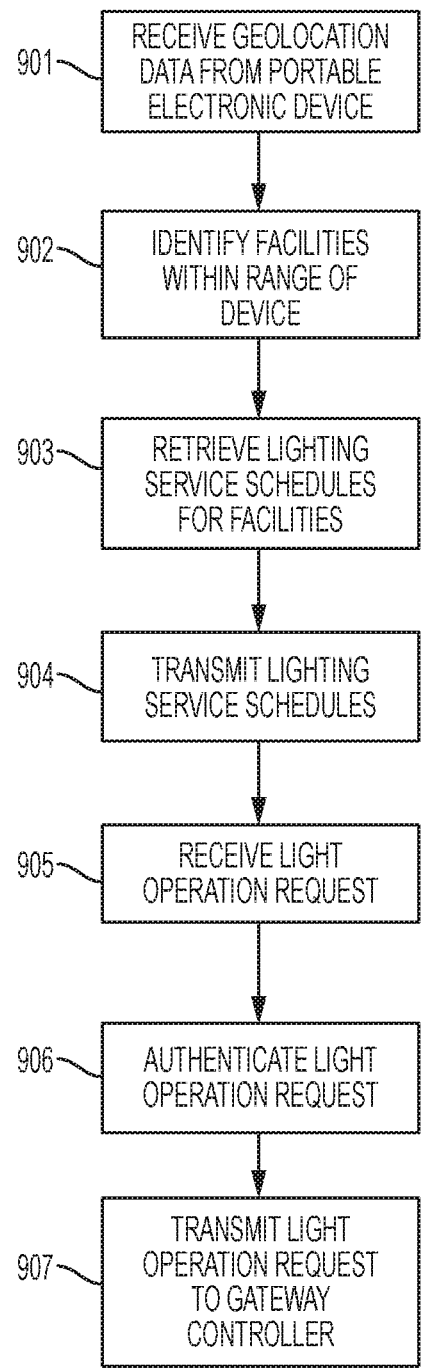
FIG. 9 illustrates example steps by which a system may control lighting services at multiple light-enable facilities.

As shown in the flowchart of FIG. 9, a remote server may use geolocation data, such as that received from a GPS sensor of the portable electronic device or general location knowledge of the cellular network receiver to which the portable electronic device connects, to identify the location of the portable electronic device 901. The remote server then accesses a database of light-enabled facilities to identify those that are within a geographic distance range from the device's location 902. The database may store location data for each facility and identify those facilities whose associated location is within the range of the device's location. The range may be a predetermined range (such as a distance from the device's location), or the user interface may receive a user-defined range.

Optionally, database also may include scheduling information about each facility. If so, the server may retrieve lighting service schedules for each facility for a current time, and optionally for one or more future time periods from the database 903. The server may transmit data reflecting the lighting service schedules to the portable electronic device so that the portable electronic device may display the scheduling data on its user interface 904. For example, referring back to FIG. 8 facilities 803, 805 that are available at the current time may be displayed with a first icon and facilities 811, 812 that are in use and not currently available may be displayed with a second (different) icon. Other visually distinguishable availability indicators such as text, color, or pop-up may be used as well.

Returning to FIG. 9, the server may then receive a light operation request 905 that includes a selection of at least one of the displayed light-enabled facilities, a service time that corresponds to an available lighting service schedule, and a scene (which may simply be a default scene such as "turn all lights on"), and a future time period from the remote electronic device. The remote server may authenticate the request (using user account information as described in previous embodiments) 906 and transmit the scene initiation request and schedule to the gateway controller of the selected facility 907. The gateway controller of the selected facility will then operate the lights at that facility according to the schedule and scene using procedures such as that described above in (for example) FIG. 5. Optionally, the gateway controller may only initiate the scene if and after it detects that the portable electronic device, or another portable electronic device that is associated with the user's account in proximity of the light-enabled facility. The gateway controller may detect the portable electronic device's location by having paired with the portable electronic device (e.g., by short-range or near-filed communication as previously discussed), or by receiving data from the remote server indicating that the remote server has received geolocation data from the portable electronic device indicating that the device is proximate to the gateway controller.

Figure 10:
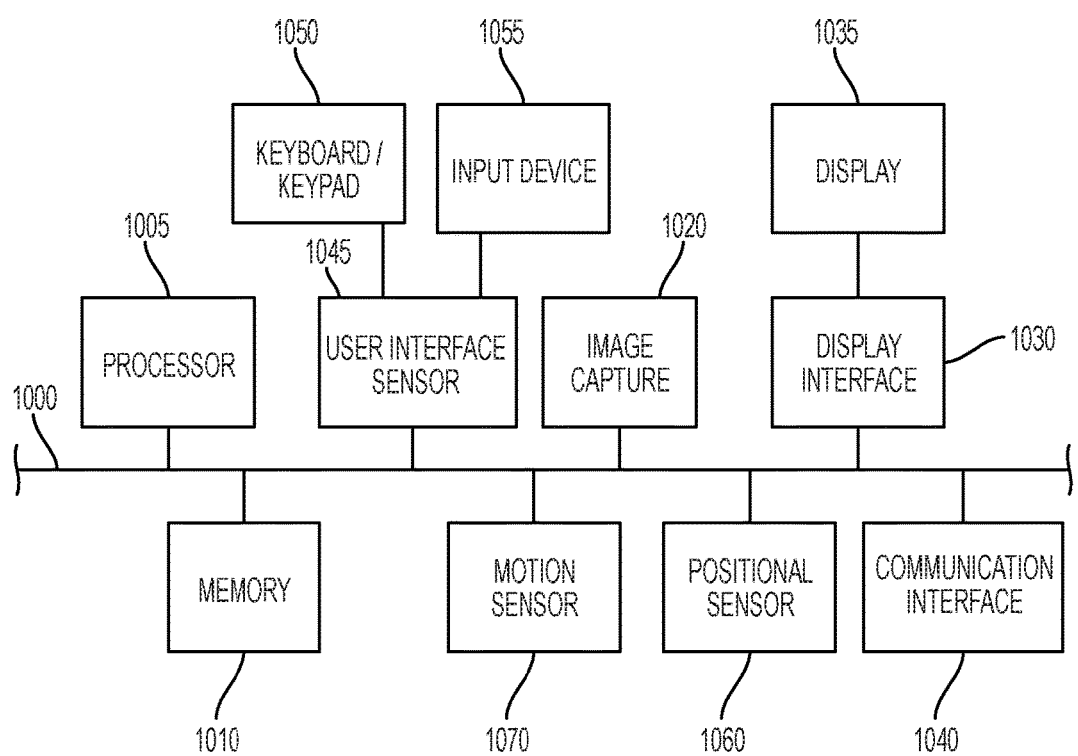
FIG. 10 illustrates various hardware components that may be included in one or more electronic devices.

FIG. 10 is a block diagram of hardware that may be included in any of the electronic devices described above, such as the gateway controller, the portable electronic device, the fixture controller, the remote server or the lighting device. A bus 1000 serves as an information highway interconnecting the other illustrated components of the hardware. The bus may be a physical connection between elements of the system, or a wired or wireless communication system via which various elements of the system share data. Processor 1005 is a processing device of the system performing calculations and logic operations required to execute a program. Processor 1005, alone or in conjunction with one or more of the other elements disclosed in FIG. 10, is an example of a processing device, computing device or processor as such terms are used within this disclosure. The processing device may be a physical processing device, a virtual device contained within another processing device, or a container included within a processing device. If the electronic device is a gateway controller, processor 1005 may be a component of the gateway controller. If the electronic device is a remote server, processor 1005 may be a component of a server on a cloud-computing network. If the electronic device is a lighting device, processor 1005 may be a component of a fixture controller if the fixture controller is an internal component of the lighting device, and the device would also include a power supply and optical radiation source as discussed above.

A memory device 1010 is a hardware element or segment of a hardware element on which programming instructions, data, or both may be stored. An optional display interface 1030 may permit information to be displayed on the display 1035 in audio, visual, graphic or alphanumeric format. Communication with external devices, such as a printing device, may occur using various communication interfaces 1040, such as a communication port, antenna, or near-field or short-range transceiver. A communication interface 1040 may be communicatively connected to a communication network, such as the Internet or an intranet.

The hardware may also include a user interface sensor 1045 which allows for receipt of data from input devices such as a keyboard or keypad 1050, or other input device 1055 such as a mouse, a touchpad, a touch screen, a remote control, a pointing device, a video input device and/or a microphone. Data also may be received from an image capturing device 1020 such as a digital camera or video camera. A positional sensor 1060 and/or motion sensor 1070 may be included to detect position and movement of the device. Examples of motion sensors 1070 include gyroscopes or accelerometers. Examples of positional sensors 1060 such as a global positioning system (GPS) sensor device that receives geolocation data from an external GPS network.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A system for controlling one or more lighting devices, the system comprising:
    a processor in communication with a portable electronic device; and
    a memory device containing programming instructions for a lighting system control application that is configured to cause the processor to:
        transmit, to the portable electronic device, a set of available scenes for one or more gateway controllers, wherein each gateway controller is configured to be communicatively coupled to one or more fixture controllers, and each fixture controller is connected to one or more lighting devices in a network of lighting devices,
        receive, from the portable electronic device, a light operation request comprising a selected scene and a time duration,
        determine whether the portable electronic device is authorized to cause a gateway controller associated with the selected scene to implement the light operation request,
        in response to determining that the portable electronic device is authorized to cause the gateway controller associated with the selected scene to implement the light operation request, transmit, to the gateway controller associated with the selected scene, the light operation request and an authorization token to cause the gateway controller to activate at least one lighting device according to the selected scene and the time duration.

2. The system of claim 1, wherein the light operation request is configured to, when received by the gateway controller, cause the gateway controller to initiate or maintain the at least one lighting device in a first condition at a first time, and then switch the at least one lighting device to a second condition when the time duration expires.

3. The system of claim 1, wherein the programming instructions for the lighting system control application to cause the processor to transmit, to the portable electronic device, the set of available scenes for the one or more gateway controllers, comprise programming instructions to:
    receive from the portable electronic device, an identifier associated with one of the one or more gateway controllers; and transmit to the portable electronic device a set of available scenes for the gateway controller associated with the receiver identifier.

4. The system of claim 1, wherein the programming instructions for the lighting system control application to cause the processor to determine whether the portable electronic device is authorized to cause the gateway controller associated with the selected scene to implement the light operation request comprise programing instructions to:
receive a user credential from the portable electronic device or the gateway controller; and
verify the user credential.

5. The system of claim 1, wherein the programming instructions for the lighting system control application to cause the processor to determine whether the portable electronic device is authorized to cause the gateway controller associated with the selected scene to implement the light operation request comprise programing instructions to:
receive a first account identifier from the gateway controller associated with the selected scene;
receive a second account identifier from the portable electronic device;
determine user credentials by comparing the first account identifier with the second account identifier; and
verify the user credential information.

6. The system of claim 1, wherein the memory device also includes programming instructions that are configured to cause the processor to:
receive, from the gateway controller associated with the selected scene, a signal indicating that the time duration is about to expire;
receive, from the portable electronic device, a request to extend the time duration to an extended time; and
transmit, to the gateway controller associated with the selected scene, the request to extend the time duration so that the gateway controller may cause the at least one lighting device to continue to emit light that exhibits the settings for the selected scene through the extended time.

7. The system of claim 1, wherein the programming instructions for the lighting system control application to cause the processor to transmit, to the portable electronic device, the set of available scenes for the one or more gateway controllers comprise programming instructions to receive, from at least one of the one or more gateway controllers, an indication that the portable electronic device has paired with the at least one gateway controller.

8. The system of claim 1, wherein each of the one or more scenes comprises a set of data corresponding to one or more optical characteristics of one or more lighting devices in the network, wherein the one or more optical characteristics comprise:
a brightness or dimming level;
color temperature;
color;
$D_{uv}$;
beam shape; or
beam direction.

9. The system of claim 1, wherein the memory device also includes programming instructions that are configured to cause the processor to:
detect geolocation data indicating a location of the portable electronic device;
identify a group of the light-enabled facilities that are within a distance range from the location of the portable electronic device;
transmit, to the portable electronic device, identifying information for the group of the light-enabled facilities; and
receive, from the portable electronic device, a selection of one of the local light-enabled facilities to which to direct the light operation request,
wherein the programming instructions to transmit, to the portable electronic device, the set of available scenes for one or more gateway controllers comprise instructions to transmit the set of available scenes associated with one or more gateway controllers of the selected local light-enabled facility.

10. The system of claim 9, further comprising a database of data for a plurality of light-enabled facilities; and
the programming instructions for the lighting system control application to cause the processor to identify the group of light-enabled facilities that are within a distance range from the portable electronic device comprise instructions to access the database and extract from the database identification data for light-enabled facilities having location data that is within the distance range of the location of the portable electronic device.

11. The system of claim 10, wherein:
the database also includes a plurality of lighting service schedules for at least some of the light-enabled facilities in the database; and
the memory device further comprises additional programming instructions that are configured to cause the processor to, for at least some of the light-enabled facilities in the group:
extract lighting service schedules from the database,
based on the extracted lighting service schedules, identify lighting devices in the group having one or more available lighting service schedule times for which the lighting devices' light-enabled facility has not been reserved,
transmit the transmit lighting service schedules for at least some of the lighting devices in the group to the portable electronic device for output by a user interface of the portable electronic device,
receive, from the portable electronic device with the light operation request, a service time that corresponds to an available lighting service schedule times for the selected light-enabled facility,
confirm that the portable electronic device is authorized to reserve the selected light-enabled facility at the service time, and
update the database to indicate that the selected light-enabled facility has been reserved for the selected service time.

12. The system of claim 1, wherein the memory device contains additional programming instructions configured to cause the processor to:
receive, from the portable electronic device, a request to unlock a first user-selectable setting corresponding to an optical characteristic corresponding to the selected scene and displayed on a user interface of the portable electronic device, for which the ability to adjust is locked;
charge to an account associated with the portable electronic device, an amount that is assigned to the first user-selectable setting;
cause the portable electronic device to unlock the ability to adjust the first user-selectable setting;

receive, from the portable electronic device, a value for the first user-selectable setting; and transmit, to the gateway controller associated with the selected scene, the light operation request to include the value for the first user-selectable setting.

13. A method for controlling one or more lighting devices in a network of lighting devices, the method comprising, by a processor:

transmitting, to a portable electronic device, a set of available scenes for one or more gateway controllers, wherein each gateway controller is configured to be communicatively coupled to one or more fixture controllers, and each fixture controller is connected to one or more lighting devices in a network of lighting devices;

receiving, from the portable electronic device, a light operation request comprising a selected scene and a time duration;

determining whether the portable electronic device is authorized to cause a gateway controller associated with the selected scene to implement the light operation request; and in response to determining that the portable electronic device is authorized to cause the gateway controller associated with the selected scene to implement the light operation request, transmitting, to the gateway controller associated with the selected scene, the light operation request and an authorization token to cause the gateway controller to activate at least one lighting device according to the selected scene and the time duration.

14. The method of claim 13, wherein the light operation request is configured to, when received by the gateway controller, cause the gateway controller to initiate or maintain the at least one lighting device in a first condition at a first time, and then switch the at least one lighting device to a second condition when the time duration expires.

15. The method of claim 13, wherein transmitting, to the portable electronic device, the set of available scenes for the one or more gateway controllers comprises:

receiving from the portable electronic device, an identifier associated with one of the one or more gateway controllers; and transmitting, to the portable electronic device, a set of available scenes for the gateway controller associated with the receiver identifier.

16. The method of claim 13, wherein determining whether the portable electronic device is authorized to cause a gateway controller associated with the selected scene to implement the light operation request comprises:

receiving a user credential from the portable electronic device or the gateway controller; and verifying the user credential.

17. The method of claim 13, wherein determining whether the portable electronic device is authorized to cause a gateway controller associated with the selected scene to implement the light operation request comprises:

receiving a first account identifier from the gateway controller associated with the selected scene;

receiving a second account identifier from the portable electronic device;

determining user credentials by comparing the first account identifier with the second account identifier; and verifying the user credential information.

18. The method of claim 13, further comprising:

receiving, from the gateway controller associated with the selected scene, a signal indicating that the time duration is about to expire;

receiving, from the portable electronic device, a request to extend the time duration to an extended time; and transmitting the request to extend the time duration to the gateway controller associated with the selected scene so that the gateway controller may cause the at least one lighting device to continue to emit light that exhibits the selected scene through the extended time.

19. The method of claim 13, wherein transmitting, to the portable electronic device, the set of available scenes for the one or more gateway controllers comprises receiving from at least one of the one or more gateway controllers an indication that the portable electronic device has paired with the at least one gateway controller.

20. The method of claim 13, further comprising:

detecting geolocation data indicating a location of the portable electronic device;

transmitting, to the portable electronic device, availability data for a plurality of local light-enabled facilities that are within a distance range of the location, each of which comprises a gateway controller and a plurality of lighting devices; and receiving, from the portable electronic device, a selection of one of the local light-enabled facilities to which to direct the light operation request, wherein transmitting, to the portable electronic device, the set of available scenes for one or more gateway controllers comprises transmitting the set of available scenes associated with one or more gateway controllers of the selected local light-enabled facility.

21. The method of claim 13, further comprising:

receiving, from the portable electronic device, a request to unlock a first user-selectable setting corresponding to an optical characteristic corresponding to the selected scene and displayed on a user interface of the portable electronic device, for which the ability to adjust is locked;

charging to an account associated with the portable electronic device, an amount that is assigned to the first user-selectable setting;

causing the portable electronic device to unlock the ability to adjust the first user-selectable setting;

receiving, from the portable electronic device, a value for the first user-selectable setting; and transmitting, to the gateway controller associated with the selected scene, the light operation request to include the value for the first user-selectable setting.

* * * * *

UNITED STATES PATENT AND TRADEMARK OFFICE
CERTIFICATE OF CORRECTION

PATENT NO. : 10,492,266 B2
APPLICATION NO. : 16/154050
DATED : November 26, 2019
INVENTOR(S) : Brian M. Wilson et al.

Page 1 of 1

It is certified that error appears in the above-identified patent and that said Letters Patent is hereby corrected as shown below:

On the Title Page

(71) Applicant: replace "Intellectual" with "Intelligent"

(73) Assignee: replace "Intellectual" with "Intelligent"

Signed and Sealed this
Eighteenth Day of February, 2020

Andrei Iancu
*Director of the United States Patent and Trademark Office*